(12) United States Patent
Cox et al.

(10) Patent No.: US 7,239,316 B1
(45) Date of Patent: Jul. 3, 2007

(54) METHOD AND APPARATUS FOR GRAPHICALLY MANIPULATING DATA TABLES

(75) Inventors: Kenneth Charles Cox, Naperville, IL (US); Lichan Hong, Mountain View, CA (US); Paul L. Richman, Boulder, CO (US); Jose F. Velez, Denver, CO (US); Robert C Steiner, Broomfield, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 333 days.

(21) Appl. No.: 09/711,403

(22) Filed: Nov. 13, 2000

(51) Int. Cl.
*G06T 11/20* (2006.01)

(52) U.S. Cl. ............... 345/440; 345/440.1; 707/102

(58) Field of Classification Search .............. 345/764, 345/771, 773, 440–443, 619, 674; 707/102
See application file for complete search history.

(56) References Cited

U.S. PATENT DOCUMENTS

| | | | |
|---|---|---|---|
| 4,800,510 A | 1/1989 | Vinberg et al. ............. 364/521 |
| 4,999,789 A * | 3/1991 | Fiasconaro .................. 345/427 |
| 5,357,202 A * | 10/1994 | Henderson .................. 324/557 |
| 5,510,809 A | 4/1996 | Sakai et al. ................. 345/140 |
| 5,581,678 A * | 12/1996 | Kahn .......................... 345/440 |
| 5,680,557 A * | 10/1997 | Karamchetty ............... 715/866 |
| 5,760,767 A * | 6/1998 | Shore et al. ................ 715/723 |
| 5,956,691 A * | 9/1999 | Powers ......................... 705/4 |
| 5,999,193 A | 12/1999 | Conley, Jr. et al. ......... 345/440 |
| 6,222,540 B1 * | 4/2001 | Sacerdoti .................... 345/581 |
| 6,362,839 B1 * | 3/2002 | Hamilton et al. ........... 715/764 |
| 6,366,889 B1 * | 4/2002 | Zaloom .......................... 705/7 |
| 6,407,751 B1 | 6/2002 | Minami et al. ............. 345/736 |
| 6,792,590 B1 * | 9/2004 | Pierrat et al. ................. 716/19 |
| 6,810,401 B1 * | 10/2004 | Thompson et al. ......... 707/101 |
| 2002/0046072 A1 | 4/2002 | Arai et al. ...................... 705/8 |
| 2002/0097436 A1 * | 7/2002 | Yokoyama et al. .......... 358/2.1 |
| 2002/0191023 A1 * | 12/2002 | Chandhoke et al. ........ 345/771 |
| 2003/0014379 A1 * | 1/2003 | Saias et al. .................. 706/45 |

OTHER PUBLICATIONS

Microsoft Office 2000 professional edition (G. Courter; A. Marquis, dated 1999), pp. 581-691.*
A generator of direct manipulation office systems Scott E. Hudson, Roger King, Jul. 1986.*
Centurion software fault tolerance design and analysis toolWakefield, G.S.; Dziegiel, R., Jr.; Pullum, L.L.; Computer Assurance, 1994. COMPASS '94 'Safety, Reliability, Fault Tolerance, Concurrency and Real Time, Security'. Proceedings of the Ninth Annual.*
Amini, J. "Model Analysis of Red Blood Cell Flow Through Diverging and Converging Microvascular Bifurcations," The George Washington University, 1994, see table 15.*
U.S. Appl. No. 09/634,158, filed Aug. 9, 2000, Cox et al.
U.S. Appl. No. 09/516,088, filed Mar. 1, 2000, Cox et al.

* cited by examiner

*Primary Examiner*—Kee M. Tung
*Assistant Examiner*—J. Amini
(74) *Attorney, Agent, or Firm*—Sheridan Ross P.C.

(57) ABSTRACT

An interactive display system includes a display such as a cathode ray tube (CRT), for example, and a display controller. The display controller and display operate in concert to display graphical images that are representative of numerical, tabular, data. The display system may be used to edit, for example, to create or modify, the data tables being graphically represented. The edited data tables may be used to simulate processes, such as workflow processes.

22 Claims, 13 Drawing Sheets

METHOD AND APPARATUS FOR GRAPHICALLY MANIPULATING DATA TABLES

FIELD OF THE INVENTION

The invention relates to display systems and, more particularly, to interactive displays for the presentation and manipulation of data.

BACKGROUND OF THE INVENTION

Data are often stored as numerical representations organized in tabular form. Such data tables may be used for analyses, such as work flow analyses or for other applications, particularly in large-scale work environments. For example, in a telecommunications call center environment, data related to each operator, to each operator station, and to various call center functions may be stored in a central database and converted to data tables for analysis by call center operations managers. By analyzing the past behavior of individual operators exposed to different sets of circumstances, a manager may make predictions about future staffing requirements, for example. Although tabular organization of numerical data greatly enhances the comprehensibility of such data, large volumes of numerical data may still present analytical difficulties to managers or others attempting to employ such data for planning, reporting, or other purposes.

Data organized in tabular form may also be employed in various simulation functions. In a simulation application, data tables may provide the input data for a simulation and offer storage for data modified during a simulation. By manipulating the data stored in tables, a simulation operator may adjust the input data values used in a simulation. Again, however, the manipulation of large volumes of numerical data, even if it is organized in tabular form, may present a daunting task to a human operator that is attempting to initiate or adjust a simulation.

An apparatus and method that provide readily comprehensible representations of data for analysis and/or simulation would therefore be highly desirable

SUMMARY

An interactive display system in accordance with the principles of the present invention includes an output device, such as a cathode ray tube (CRT), liquid crystal display (LCD), or other display device and a display controller. The display controller and display device operate in concert to display graphical, diagrammatic, images that are representative of numerical, tabular data. Additionally, the interactive display system may be configured to create or modify data tables and the data tables may be used, for example in a simulator.

In accordance with one aspect of the invention, the display system may display one or more tables of data in a "strip chart" arrangement whereby data is arrayed along dependent and independent axes with values associated with a specific variable forming a line. A plurality of lines that may be distinguishable one from the other through use of color coding, dotted lines, various patterns, flashing or other visual cues, may be simultaneously displayed to illustrate the relationship of various table entries to an independent variable.

In addition to displaying tabular information in a manner that permits ready comprehension of data relationships, an interactive display system in accordance with the principles of the present invention permits an operator to revise, or populate data tables. The display system may employ a variety of input devices, such as a keyboard, a mouse, a joystick, and incorporate interactive techniques, such as "clicking" "double clicking", "right clicking", "left clicking", "drill down", and "menu bar selection", for example, to accept input from an operator. Using such devices and techniques (apparatuses and methods) an operator may create table entries for a new variable by selecting a table, and applying an editing function, such as "normal distribution", to the variable. The editing function may be displayed for selection graphically, in the form of an equation, in both forms, in one or more menus, and other combinations, for example. In order to edit table entries for an existing variable, an operator may select a variable by "clicking" on a data display element, such as a line, then selecting a range of values to edit, by "double clicking" at the extremes of the editing range, for example. After selecting the variable and editing range, the operator may apply various editing functions to the selected range. The modifications may be immediately reflected in the data tables, the interactive display system may await approval from the operator before storing the edited table entries, or the system may provide the operator with the option of whether to store the edited entries immediately or await approval. Variable values may be displayed in response to an operator's query that is effected, for example by "hovering" over a location of interest.

The interactive display may also be used in conjunction with a simulator, such as a workflow simulator, to populate data tables and to simulate operations, assuming the table values as starting points. The results of the simulations may also be used to update some of the table entries.

Although, for the convenience and clarity of description, examples to follow may make reference to data tables and simulations involving workflow analysis, particularly in the context of call center operations, the provision of readily comprehensible data table representations in accordance with the principles of the present invention is not restricted to any one type of data, nor are the simulations that are supported by the interactive display system restricted to one type of process.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
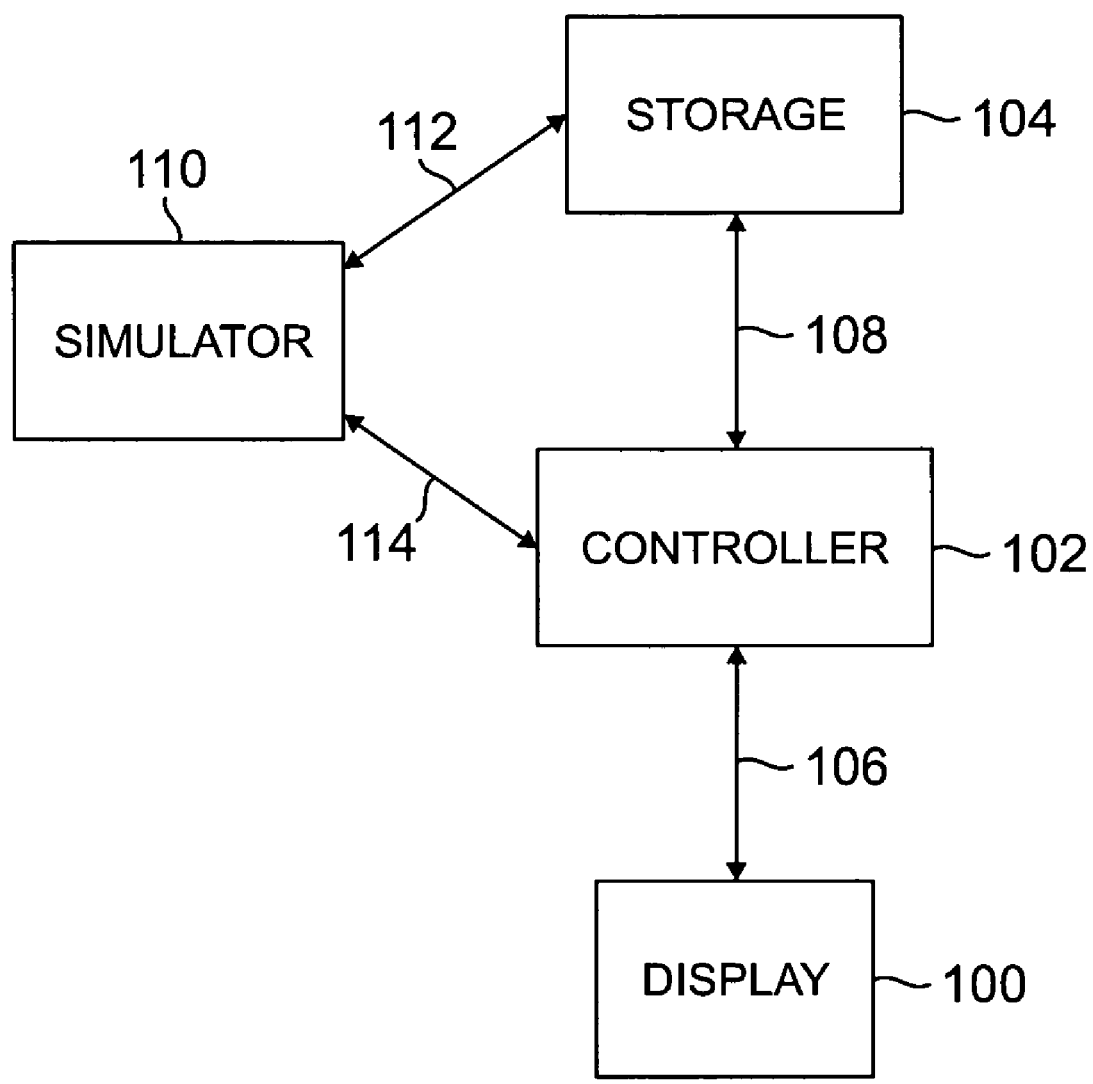
FIG. 1 is a conceptual block diagram of an interactive display system that may include a simulator in accordance with the principles of the present invention.

An interactive display system 101 in accordance with the principles of the present invention includes a display 100, such as a cathode ray tube (CRT), for example, and a display controller 102 as indicated in the conceptual block diagram of FIG. 1. The display controller 102 and display 100 operate in concert to display graphical images that are representative of numerical, tabular, data and may be used to create or modify data tables which, in turn, may be used to simulate processes, such as workflow processes. Data table storage 104 may include, for example, any of a variety of computer storage systems, such as those described in greater detail in the discussion related to FIG. 2. A database management system may be employed to store, manage, and retrieve such data. In addition to an output device such as a CRT, the display 100 may include an input device, such as keyboard or mouse, for example.

The display's input device communicates with the controller 102 through a communications channel 106 that may include a "bus", serial link, infrared, radio, or other such link. The controller 102 communicates with the display output device through the communications channel 106. The controller 102 may include various "hardware" components, such as described in the discussion related to FIG. 2, combined with "software", which may be created using object oriented programming techniques, such as described in the discussion related to FIG. 3, to effect the display of one or more tables of data in a "strip chart" arrangement whereby data is arrayed along dependent and independent axes with values associated with a specific variable forming a data display element such as a line. The controller 102 communicates with the data table storage 104 through a communications link 108. The communications channel 108 is used to transfer information from the data table storage 104 to the controller 102 for output on the display 100 and to transfer updated table information from the controller 102 to the data table storage 104. The controller 102 may include local storage for the storage of intermediate data, such as preliminary data table edits input by an operator.

A simulator 110 may obtain input data from the data table storage 104 through a communications link 112, for example, or through a communications link 114 to the controller 102. Similarly, the simulator may return data table information to the controller 102 through the link 114 or to the data table storage 104 through the link 112.

Figure 2:
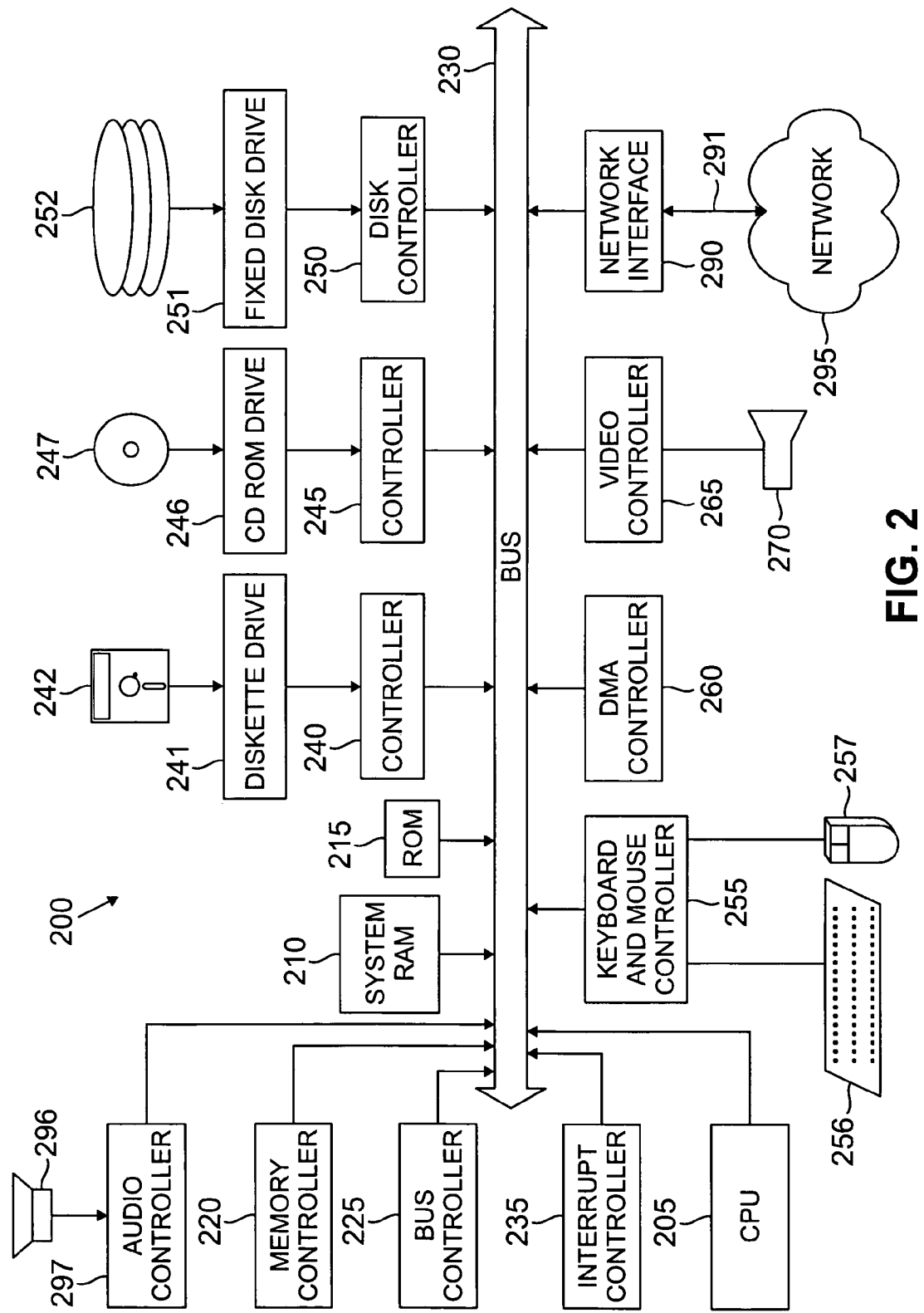
FIG. 2 is a conceptual block diagram of a computer system that may be used to display and simulate tabular data in accordance with the principles of the present invention.
Figure 3:
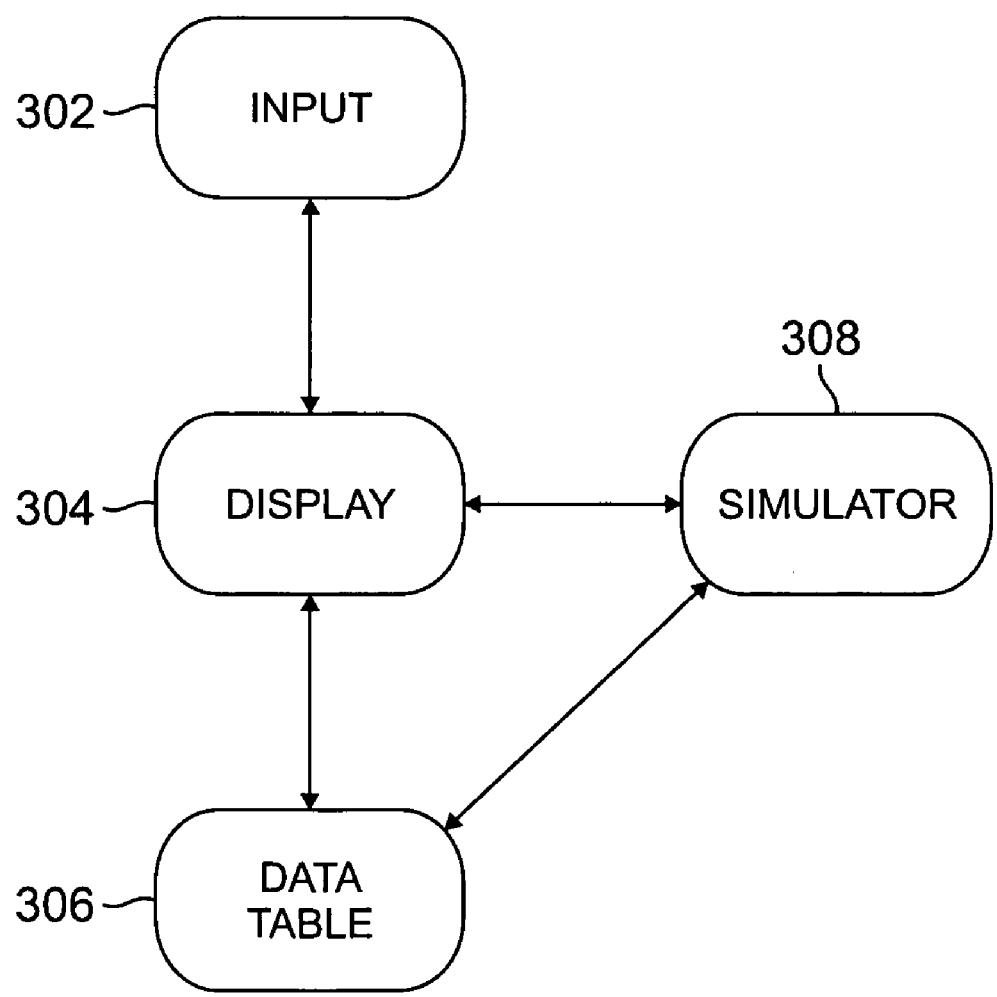
FIG. 3 is a conceptual block diagram of software objects that may be employed to implement an interactive display system in accordance with the principles of the present invention.

FIG. 2 illustrates the system architecture for a computer system 200 on which the invention may be implemented. The exemplary computer system of FIG. 2 is for descriptive purposes only. Although the description may refer to terms commonly used in describing particular computer systems, the description and concepts equally apply to other systems, including systems having architectures dissimilar to FIG. 2.

Computer system 200 includes a central processing unit (CPU) 205, which may be implemented with a conventional microprocessor, a random access memory (RAM) 210 for temporary storage of information, and a read only memory (ROM) 215 for permanent storage of information. A memory controller 220 is provided for controlling RAM 210.

A bus 230 interconnects the components of computer system 200. A bus controller 225 is provided for controlling bus 230. An interrupt controller 235 is used for receiving and processing various interrupt signals from the system components.

Mass storage may be provided by diskette 242, CD ROM 247, or hard drive 252. Data and software may be exchanged with computer system 200 via removable media such as diskette 242 and CD ROM 247. Diskette 242 is insertable into diskette drive 241 which is, in turn, connected to bus 230 by a controller 240. Similarly, CD ROM 247 is insertable into CD ROM drive 246 which is, in turn, connected to bus 230 by controller 245. Hard disc 252 is part of a fixed disc drive 251 which is connected to bus 230 by controller 250.

User input to computer system 200 may be provided by a number of devices. For example, a keyboard 256 and mouse 257 are connected to bus 230 by controller 255. An audio transducer 296, which may act as both a microphone and a speaker, is connected to bus 230 by audio controller 297, as illustrated. It will be obvious to those reasonably skilled in the art that other input devices, such as a pen and/or tabloid may be connected to bus 230 and an appropriate controller and software, as required. DMA controller 260 is provided for performing direct memory access to RAM 210. A visual display is generated by video controller 265 which controls video display 270. Computer system 200 also includes a communications adaptor 290 which allows the system to be interconnected to a local area network (LAN) or a wide area network (WAN), schematically illustrated by bus 291 and network 295. An input interface 299 operates in conjunction with an input device 293 to permit a user to send information, whether command and control, data, or other types of information, to the system 200. The input device and interface may be any of a number of common interface devices, such as a joystick, a touch-pad, a touch-screen, a speech-recognition device, or other known input device.

Operation of computer system 200 is generally controlled and coordinated by operating system software. The operating system controls allocation of system resources and performs tasks such as processing scheduling, memory management, networking, and I/O services, among things. In particular, an operating system resident in system memory and running on CPU 205 coordinates the operation of the other elements of computer system 200. The present invention may be implemented with any number of operating systems, including commercially available operating systems. One or more applications, such may also run on the CPU 205. If the operating system is a true multitasking operating system, multiple applications may execute simultaneously.

A user input object 302 may take the form of a controller for a known user input device including a device interface, such as keyboard and mouse (with corresponding controllers), a joystick, touch pad, touch screen, voice input device, etc. The interactive display engine 304 may include interfaces and controllers for various of the hardware components described in the discussion related to FIG. 2, including a display 212 and controller 210. The display engine 304 accepts input from the user input 302 and from the data table object 306. The data table object 306 organizes and stores data in tabular form and provides such data to an optional simulator object 308 or display object engine 304. The data table object may also obtain information from the simulator object 308 or from the display engine 304.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise, objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs. In accordance with the principles of the present invention, OOP, or other programming techniques may be employed to implement an interactive display system as discussed below.

Figure 4:
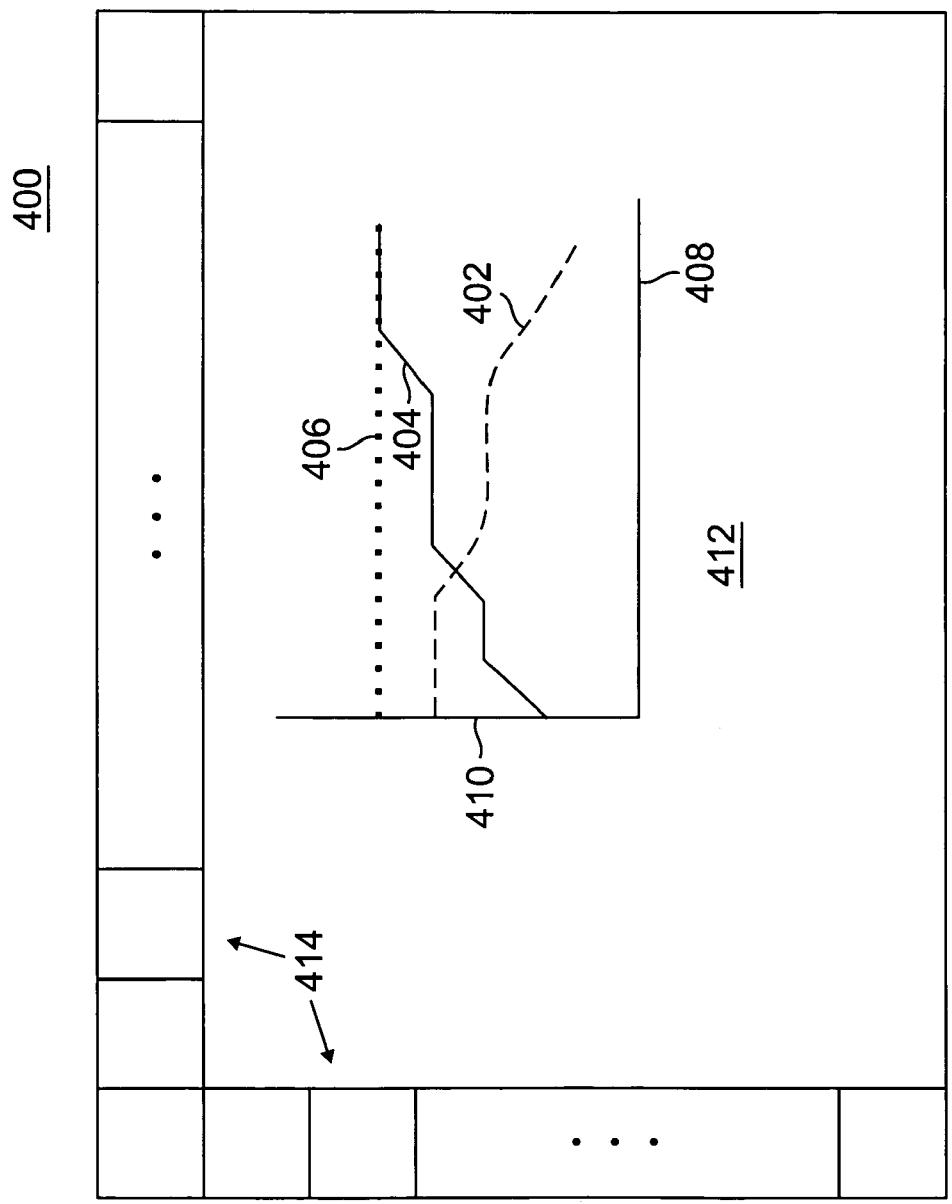
FIG. 4 is an illustrative display output such as may be used in accordance with the principles of the present invention.

An interactive display in accordance with the principles of the present invention may provide a display output 400 such as depicted in the front elevation view of FIG. 4. A plurality of data display elements, such as lines 402, 404, and 406 that represent values of different variables arrayed along independent 408 and dependent 410 axes, may be distinguishable, one from the other, through use of color coding, dotted lines, various patterns, flashing or other visual cues. Those representations may be combined, for example, at a point of intersection, to clearly distinguish the lines. One or more graphical chart display areas 412 may be displayed on the display output 400 simultaneously. Although, in this illustrative embodiment, the independent 408 and dependent 410 axes are respectively displayed horizontally and vertically, other orientations, such as having the independent axis 408 on the vertical and the dependent axis 410 on the horizontal, are contemplated within the scope of the invention. By continuously updating the chart display area 412, the interactive display may produce the illusion of motion, with, for example the lines 402, 404, and 406 appearing to move to the left within the chart display area 412. Additionally, although the independent variable may be time, and dependent variable may be workflow information, other combinations of independent and dependent variables are contemplated within the scope of the invention.

The display output 400 may include a variety of dialog boxes 414 distributed throughout the display, or along the periphery, as illustrated. Dialog boxes are known and may be employed to permit user interaction with an interactive display system. In accordance with the principles of the present invention, one or more of the dialog boxes 414 may include a graphical or algebraic representations of editing functions that may be employed to populate or modify tables represented by the graphical representations of chart display areas, such as chart display area 412. Other interactive display mechanisms, including "dials", and "slide switches" may be used for operator input.

In addition to displaying tabular information in a manner that permits ready comprehension of data relationships, an interactive display system in accordance with the principles of the present invention permits an operator to revise, or populate data tables. The display system may employ a variety of input devices, such as a keyboard, a mouse, a joystick, and incorporate interactive techniques, such as "clicking", "double clicking", "right clicking", "left clicking", "drill down", and "menu bar selection", for example, to accept input from an operator. Using such devices and techniques (or, apparatuses and methods) an operator may create table entries for a new variable by selecting a table, and applying a editing function, such as "normal distribution", to the variable. The editing function may be displayed for selection graphically, in the form of an equation, or in both forms, in one or more menus, for example. In order to edit table entries for an existing variable, an operator may select a variable by "clicking" on the line, then select a range of values to edit, by "double clicking" at the extremes of the editing range, for example. After selecting the variable and editing range, the operator may apply various editing functions to the selected range. The modifications may be immediately reflected in the data tables, the interactive display system may await approval from the operator before storing the edited table entries, or the system may provide the operator with the option of whether to store the edited entries immediately or await approval. Variable values may be displayed in response to an operator's query that is effected, for example by "hovering" over a location of interest.

Figure 5A:
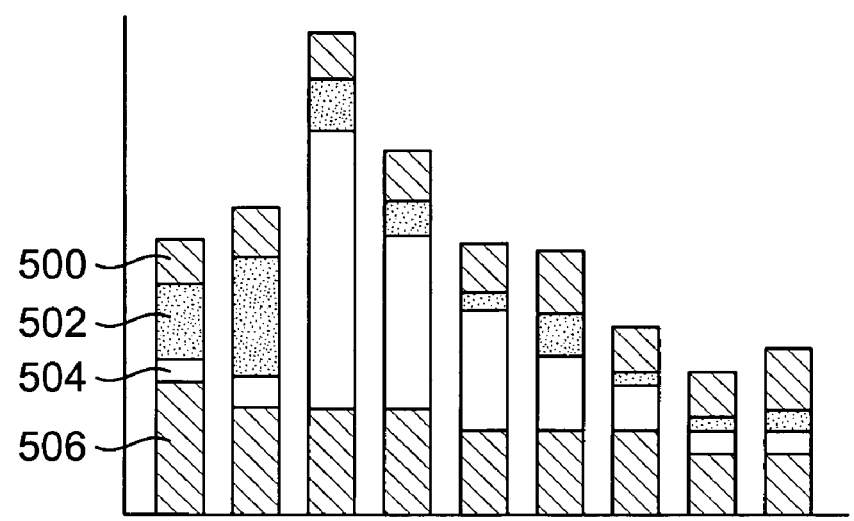
FIGS. 5A and 5B are respectively, illustrative bar chart and line chart displays that may be employed by an interactive display in accordance with the principles of the present invention.
Figure 5B:
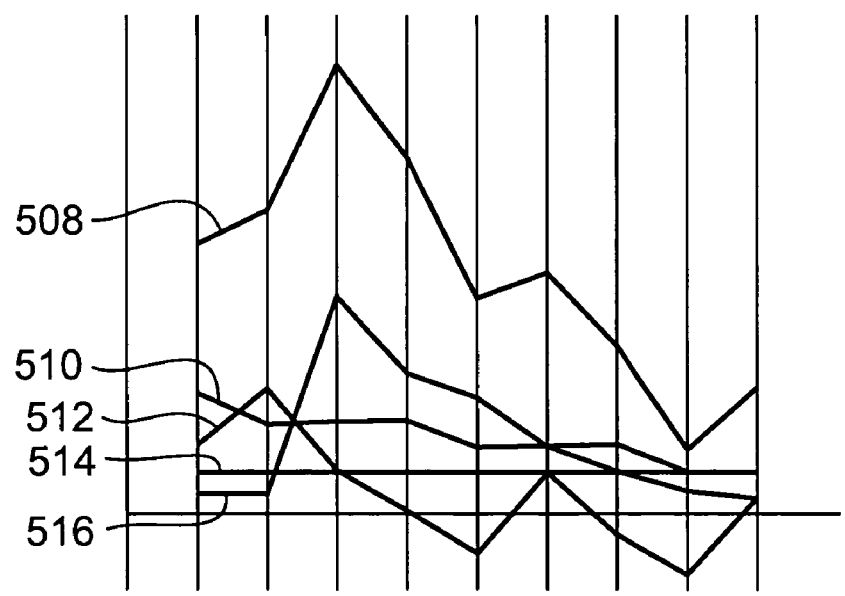

Tabular values may be displayed using a variety of techniques, with data display elements such as "stacked" bar charts, line charts, or combinations of the two, for example. As illustrated in FIG. 5A, in a stacked bar chart implementation, the values for individual variables may be stacked, one on "top" of the other (assuming a vertical orientation of the independent variable), using display differentiation techniques, such as assigned colors, to separate the individual variable values. FIG. 5B illustrates a line chart display of the data set displayed in the stacked bar chart of FIG. 5A in which stacked bar segments 500, 502, 504, and 506 of FIG. 5A respectively correspond to lines 514, 512,516, and 510 of the line chart of FIG. 5B. Line 508 represents the total value of all variables and corresponds to the outline of the stacked bar chart of FIG. 5A. The line chart of FIG. 5B provides some advantages over the stacked bar chart of FIG. 5A, particularly in the display of negative variable values. In the illustrative displays of FIGS. 7 through 12 a combination of stacked bar charts and line charts will be used for illustrative purposes, but, as previously described, either stacked bar charts or line charts or combinations of the two may be employed in accordance with the principles of the present invention.

In the following illustrative displays, the controller 102 displays a data grid within a chart display area 412 that represents a table of data values, with independent variable values arrayed along the horizontal axis and dependent variable values along the vertical axis. The independent variable may be time, for example, with associated data values representative of observations separated in time. In such an illustrative embodiment, the displayed variables represent a (sorted) time-series of values that may be numeric (integer, real, or duration) values associated with comparable measures. That is, for example, in a call distribution application, comparable data might include the number of agents assigned to various tasks throughout a time period, but a comparison of idle time at an agent station with the number of agents present, or other combinations, may not be susceptible to worthwhile comparison.

In a line chart embodiment, data values may be edited directly on the line chart with a user defining the areas to be edited by sweeping operations, for example, selection of a specific variable to be edited within the swept out area by mouse clicks or keyboard operations (for example using up/down arrows to step through the columns). The editing modes will affect only the selected portion of the display.

Alternatively, a separate edit window may be provided for editing in line chart, bar chart, or combination display modes. The edit window may be a modal dialog, or it may be "pinned up" and remain visible. In this case the user could have multiple edit windows open at once. The edit windows may also allow the chart area that is selected for editing to be modified, for example by scrolling through the data. As the data is modified, the changes may be reflected in both the edit window and the main window. Data modification operations may implemented by "click-and-drag" operations under modal control, with the modes (described in greater detail in the discussions related to FIGS. 6 through 12) accessed through a popup menu, dialog box, or other interactive display technique. When a mode is selected, the controller 102 draws a guiding curve with affordances, that is, "grab points", in the edit window (in a bar chart or combination line chart/bar chart implementation, the guiding curve overlaying the bars). The initial curve is selected in a manner depending on the mode and the existing values and, in an implementation that includes bar charts, the bars are changed to follow the curve.

FIGS. 6 through 12 illustrate display formats that may be employed within a chart display area 412 in accordance with the principles of the present invention. As previously noted, various of the editing functions (or modes) available for an operator to modify display and table values may be selected using a dialog box 414 that includes a name, a graphical representation of the editing function to be applied, an equation that represents the editing function, any combination of such representations, or other selection means. Any of the modes may be employed as a default editing function, with the default editing function selectable by system user, for example. In the following illustrative examples, both line chart and stacked bar charts are illustrated, but either one, or both representations may be used in an interactive display in accordance with the principles of the present invention.

Figure 6:
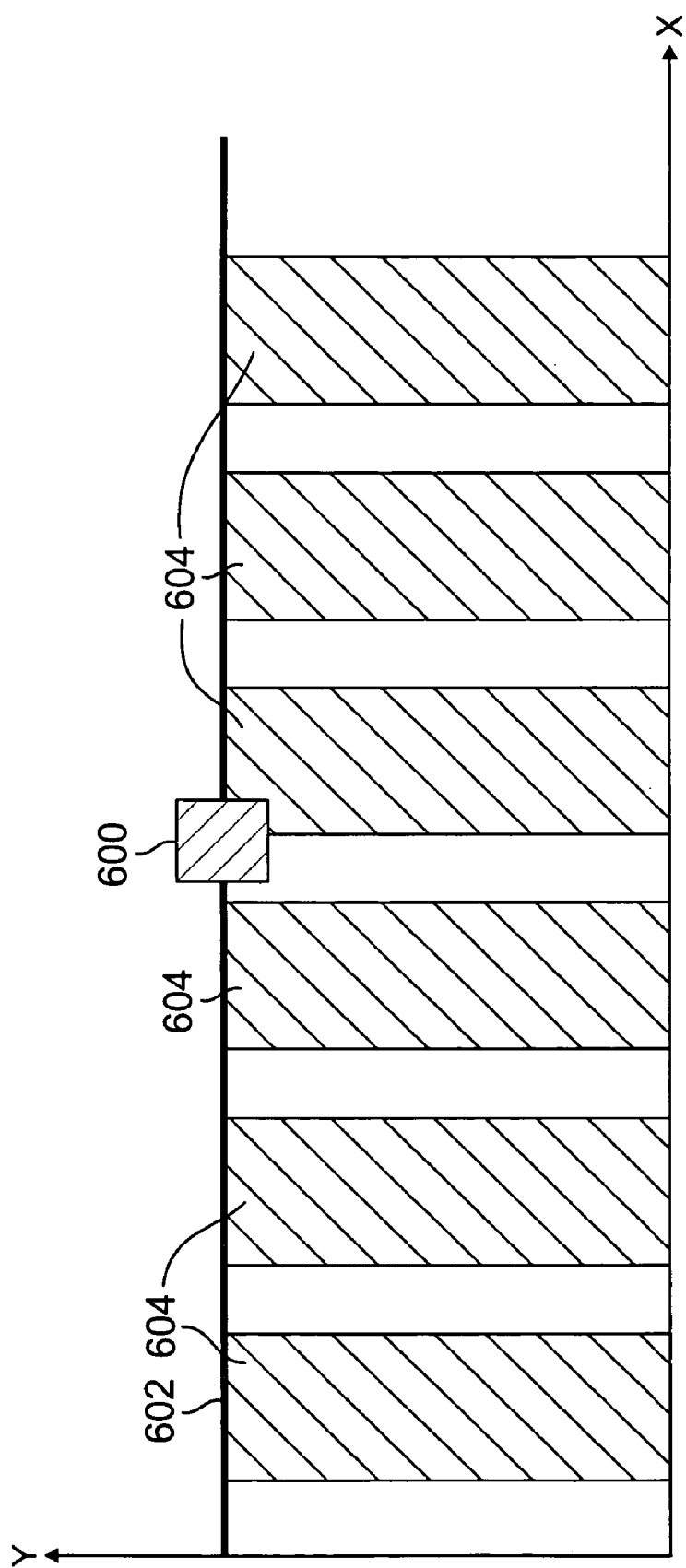
FIGS. 6 through 12 are illustrative displays of editing functions that may be employed by an interactive display in accordance with the principles of the present invention.

Turning now to FIG. 6 the "uniform" editing function is characterized by a constant value, that is; $y=c$. In operation, a user may select all or a portion of a chart display area 412 to be edited and apply an editing function, such as the uniform function, to one or more lines within the selected chart display area. In the case of the illustrated, uniform, editing function an affordance 600 may be manipulated by a system user to move the line 602 up or down, thereby increasing or decreasing the value of c. The updated values will be reflected in the bar charts 604. A user may determine the value of the dependent variable, y, at any point along a line such as line 602, using interactive display techniques, such as "hovering over" the point of interest. Although, in this illustrative display, the value would be "c" at every point along the line 602, this technique may be applied to more complicated line charts and bar graphs, such as those illustrated in FIGS. 6 through 12 As previously indicated, a editing function may be selected from a dialog box, for example, using a graphical representation, such as a miniature of the display of FIG. 6, or using a mathematical expression, in this case $y=c$. The value c may be a minimum, maximum, or average of the tabular values within the edit area of the chart display area 412, for example.

Figure 7:
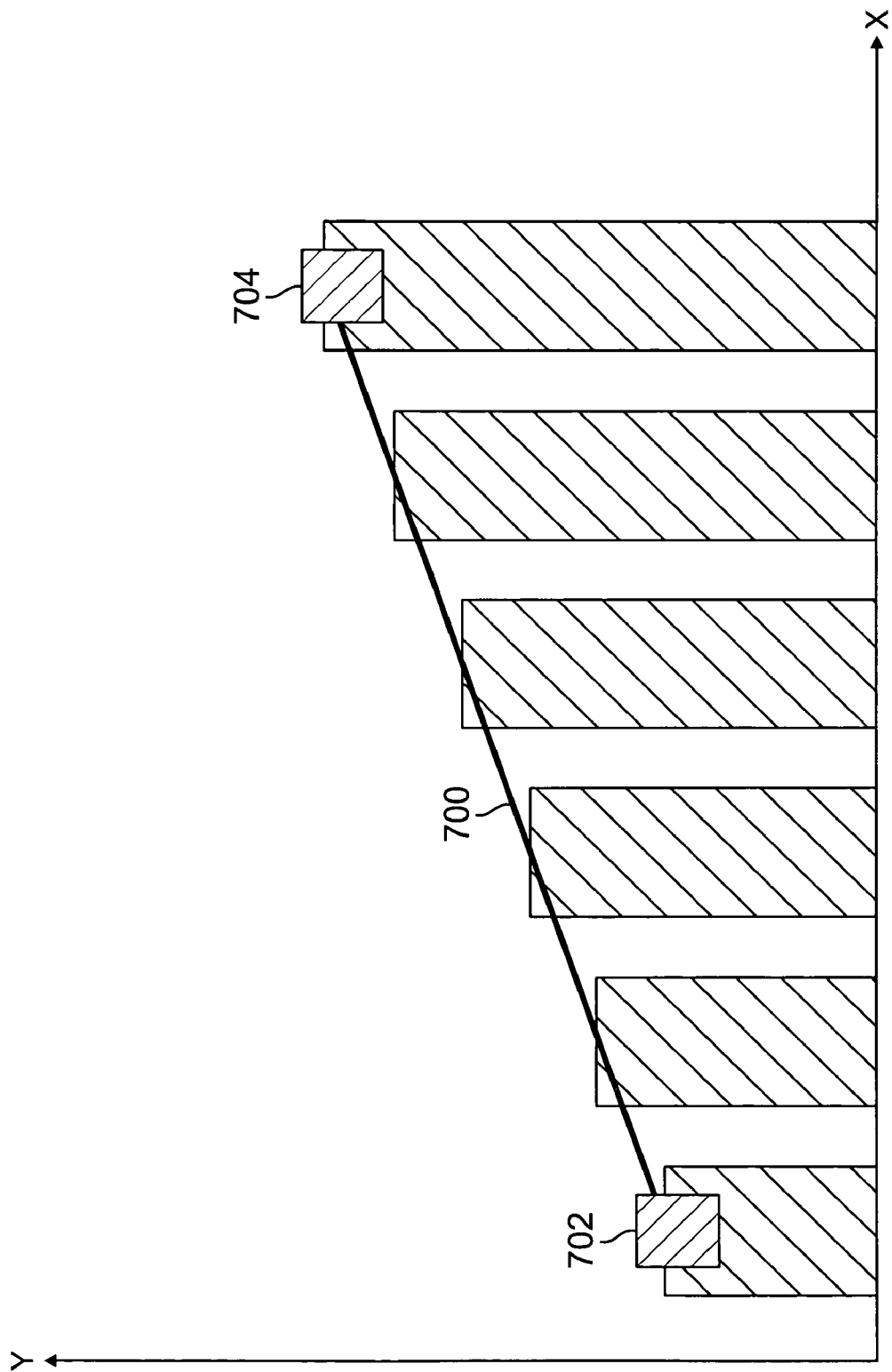

A linear curve, characterized by the function $y=mx+b$, such as illustrated by the line 700 in FIG. 7 may be manipulated by affordances 702 and 704 at either end of the line 700. Again, the line 700 reflects tabular data values. The alteration of these values through manipulation of the line 700 may be transferred immediately to the data table storage 104 or, alternatively, it may be transferred only after the user examines and approves of the alterations.

Figure 8:
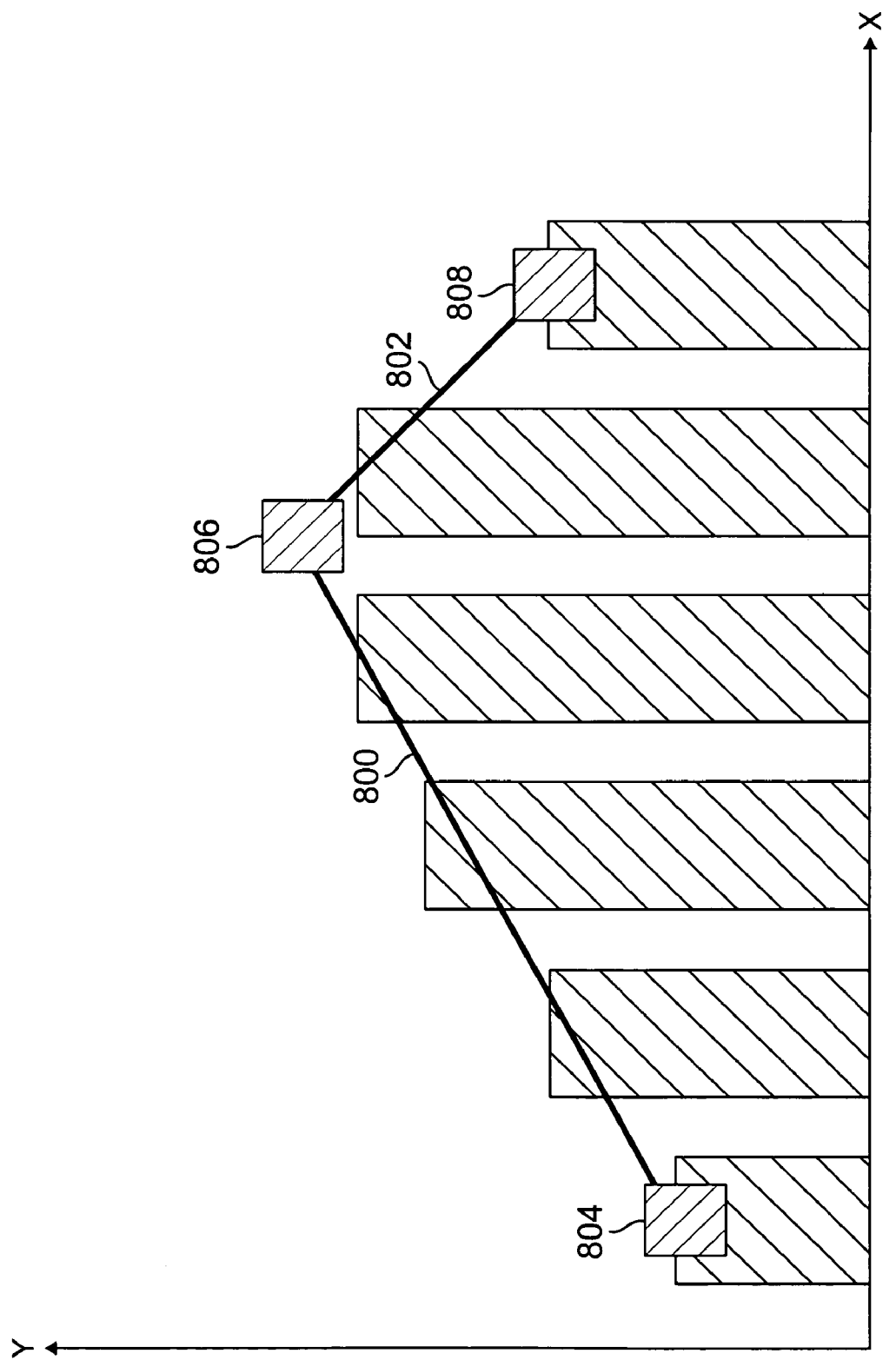
Figure 9:
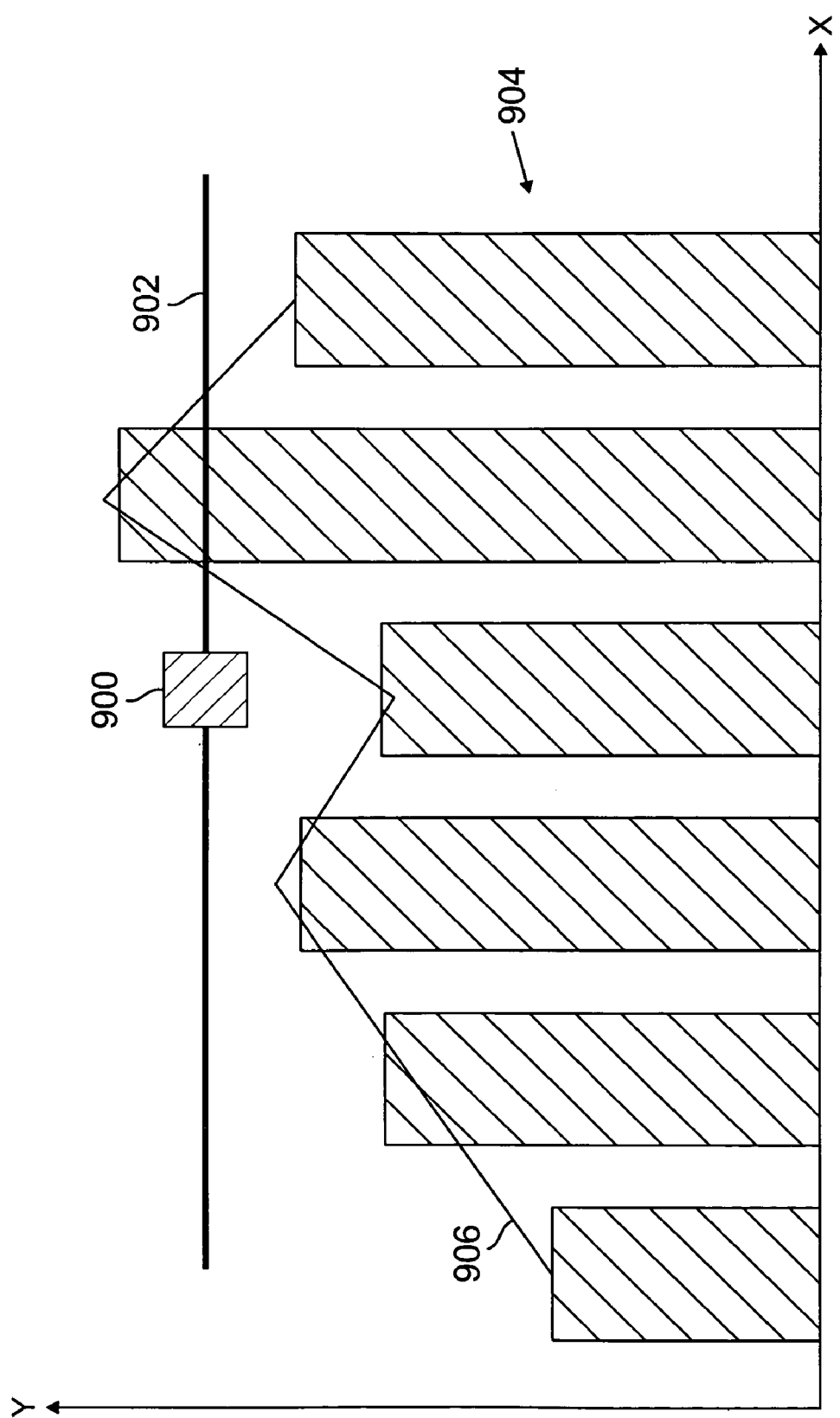

The double ramp editing function of FIG. 8 features two line segments 800 and 802 defined by three affordances, a leftmost affordance 804, a middle affordance 806, and a rightmost affordance 808. The leftmost affordance 804 and rightmost affordance 808 may be moved up and down and define the extent of the area within a graphic display area that is selected for editing. The middle affordance 806 may be moved anywhere: up, down, or sideways, within the range defined by the leftmost 804 and rightmost 808 affordances. With the "move" editing function illustrated in FIG. 9 an affordance 900 is used to move a guiding curve 902 up or down by the same amount. Using this function, the shape of the distribution, that is, the relationship of the bars 904 and/or corresponding line chart 906 remains the same, shifting up or down by the same amount. Horizontal movement of the affordance 900 may be used to circularly rotate the bar 904 and/or line 906 charts.

Figure 10:
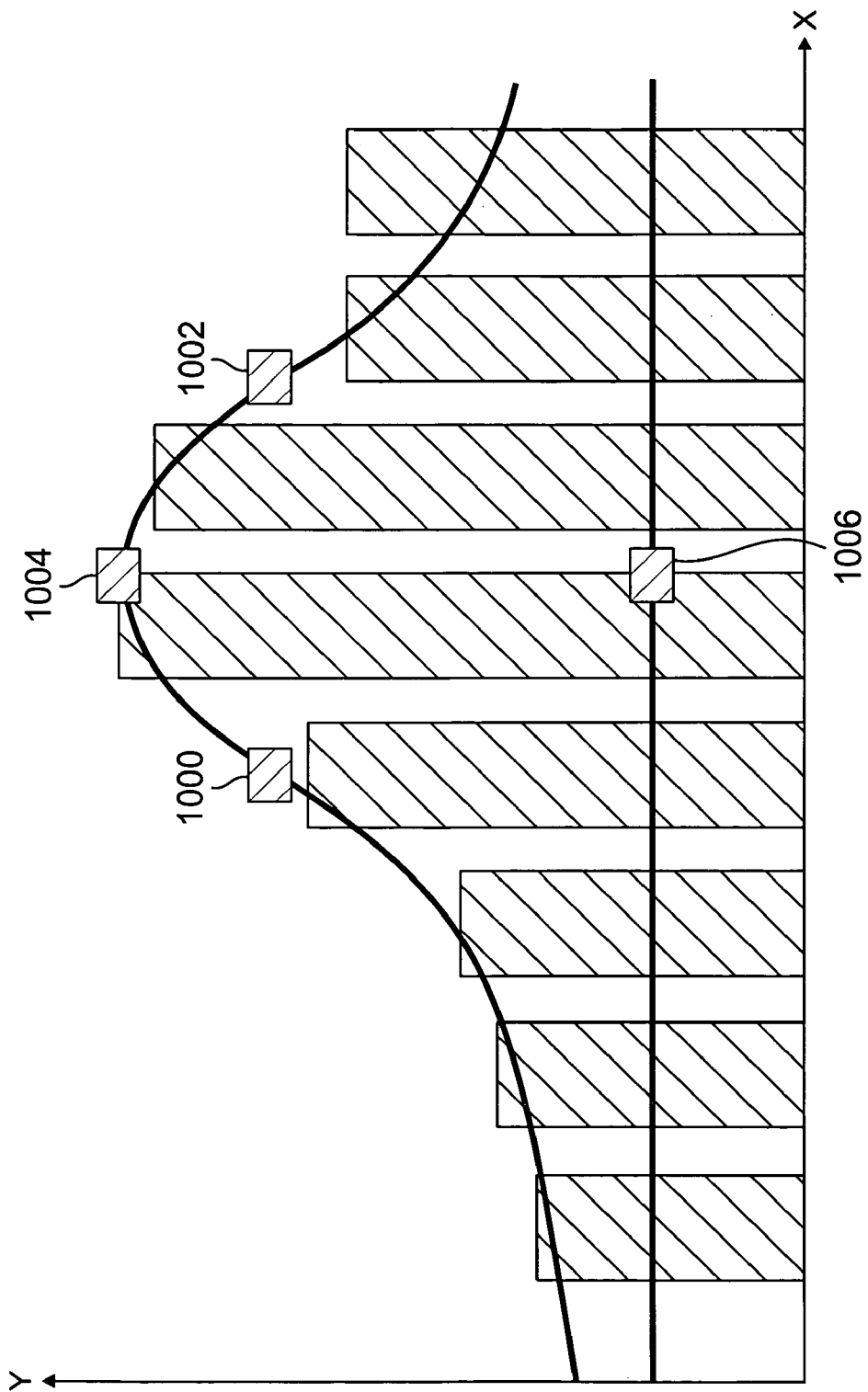

Distributions, such as the Normal, Gaussian, or Poisson distributions, may be used to edit a graphic display area 412 and to thereby alter data tables in accordance with the principles of the present invention. As illustrated in FIG. 10, when using such distributions affordances 1000 and 1002 establish a desired standard deviation, the affordance 1004 defines the mean and maximum of the distribution, and the affordance 1006 defines the baseline.

Figure 11:
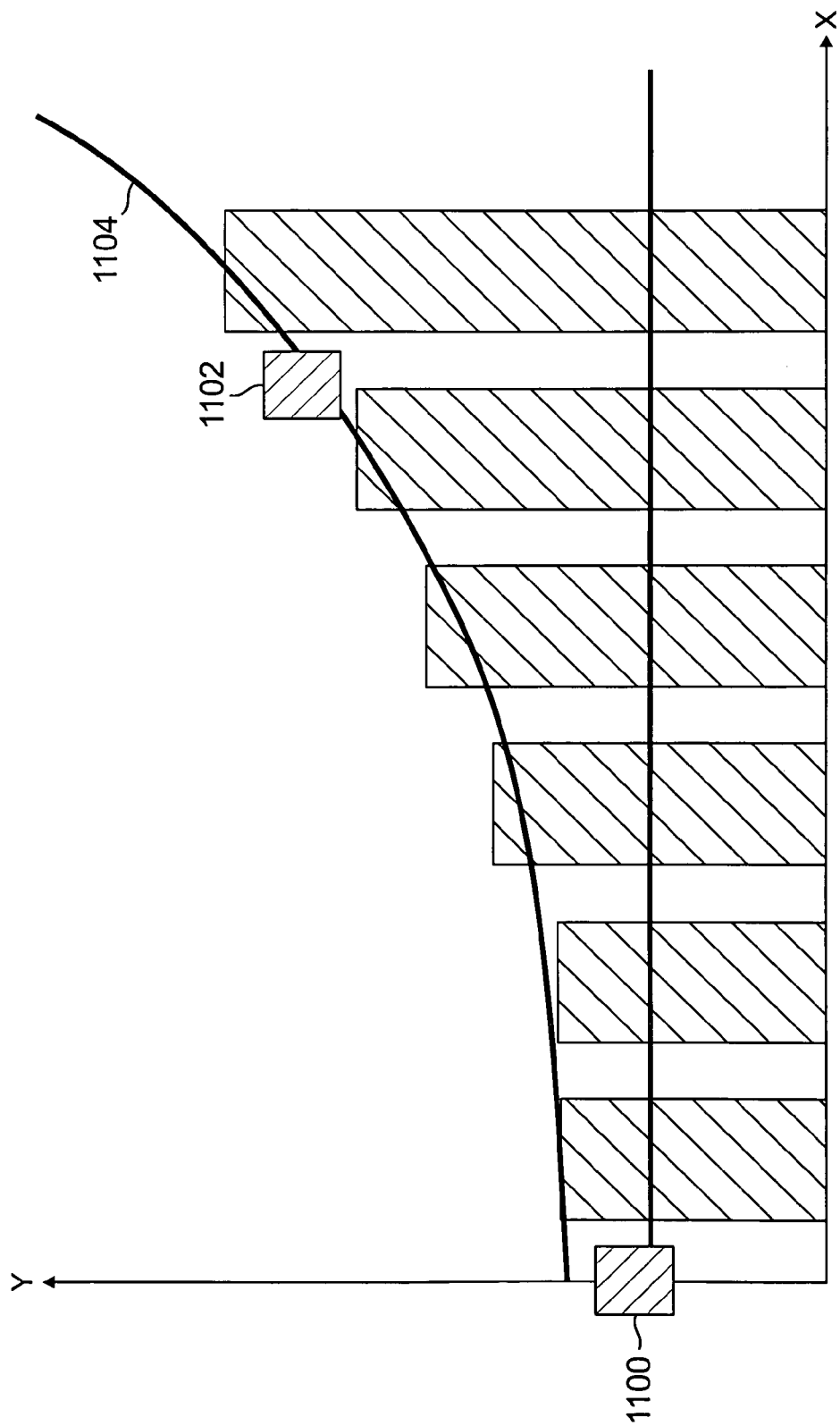

As illustrated in the chart of FIG. 11, a graphic display area 412 may be edited by the application of an increasing exponential function. An affordance 1100, which lies on the dependent, or "y", axis and which may be moved vertically by a user, defines the baseline of the exponential function. An affordance 1102 defines any point (other than that which defines the baseline) on the curve 1104. A decreasing exponential curve may be similarly defined.

Figure 12:
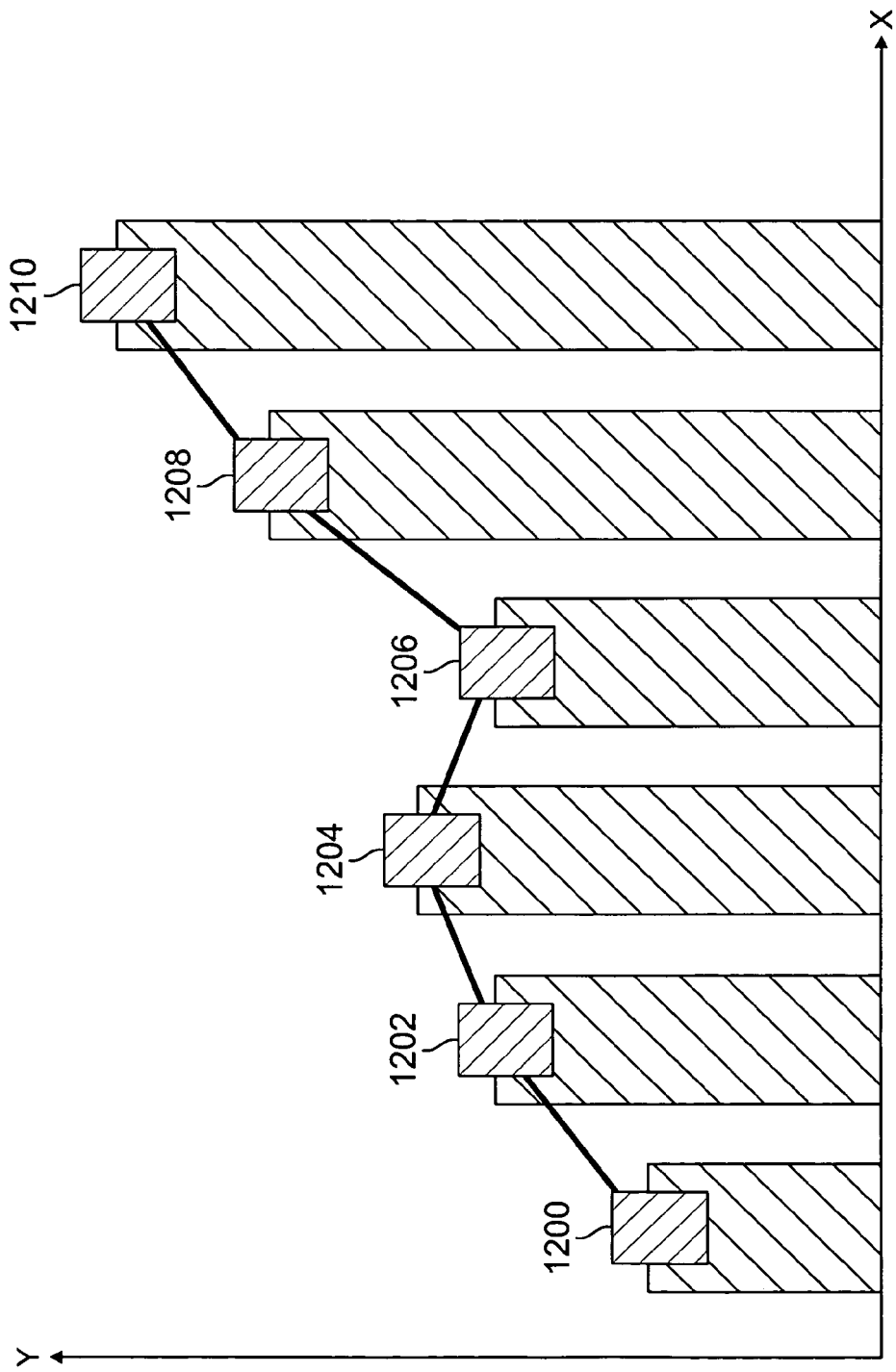

Affordances may be dedicated, as in the chart of FIG. 12, to each segment (which may correspond to a row or column of a table) of a curve susceptible of being edited. In the illustrative embodiment of FIG. 12, six affordances 1200, 1202, 1204, 1206, 1208, and 1210 each may be moved, vertically and independently, to define a table value within an edit window of a graphic display area 412.

One or more lines and one or more segments of those lines within an edit window of a graphic display area 412 may be edited in accordance with the principles of the present invention. An interactive display system in accordance with the principles of the present invention may be better understood with reference to the concept of a data grid underlying the graphical display. In that context, a data grid may be modified by adding or subtracting rows, corresponding, for example, to temporal observations, or adding or subtracting columns, which may correspond to variables. Such modifications may be made using menu or dialog boxes, for example.

New cells within the data grid, corresponding to new variable values, may be populated using editing functions such as those just described, for example. In accordance with the principles of the invention, the interactive display system may not prohibit operations on the size of the data grid. If, for example, the data grid must have a predetermined number of rows and columns for use in another operation, such as a simulation, for example, the interactive display system may prohibit a user from modifying the size of a data grid. Additionally, the display may automatically resize and re-scale to fit the data. The re-scaling may include re-scaling of such things as the axes and font sizes used in the display. Additionally, interactive techniques, such as "zoom-bars", may be employed to override automatic re-sizing and re-scaling, thereby allowing a user to focus on specific sections of the display, corresponding to specific data of interest to a user.

Querying mechanisms, such as "Tool-Tips" may permit a user to query a specific point on the display to determine a variable, an observation, a specific value, or other characteristics associated with the underlying data. Display differentiation techniques, such as color coding, may be automatic, with a facility for a user to override default color coding. The interactive display system may permit a user to choose whether or not labels associated with the data are displayed and a legend may be used to indicate to a user color assignments, for example.

Figure 13:
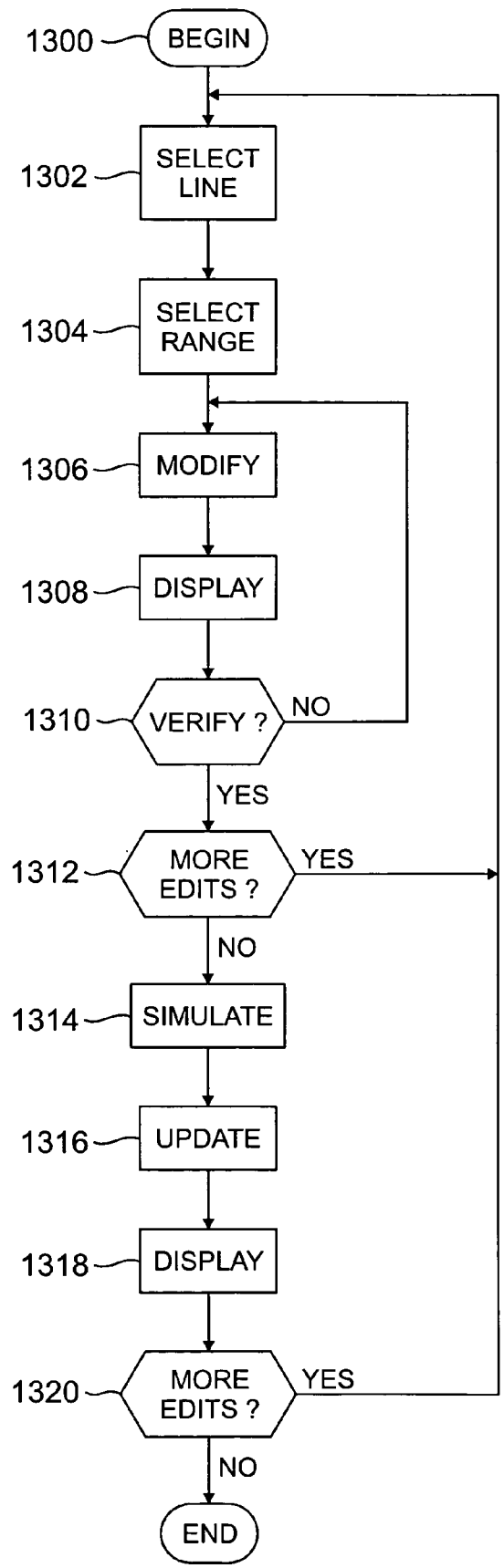
FIG. 13 is a flow chart illustrative of the process of editing tabular data using an interactive display in accordance with the principles of the present invention.

The flow chart of FIG. 13 depicts a process that may be employed to modify an interactive display in accordance with the principles of the present invention. In the discussion related to FIG. 13, it is assumed that tabular data has been displayed on an output device and the interactive display is used to edit data tables represented by line charts on the interactive display. The process begins in step 1300 and proceeds from there to step 1302 where a user selects a line for editing by, for example, double clicking on a line of interest. From step 1302 the process proceeds to step 1304 where a user selects, as previously described, a range within a graphical display window within which the line chart is to be edited. The interactive display may continuously display editing options such as the editing functions described above, or it may, display the options in response to the selection processes of steps 1302 and 1304 and, as previously described, the selections may be made through use of pull down menus, dialog boxes, or other interactive display techniques.

However the selections of steps 1302 and 1304 are made, in step 1306 a user modifies the display, using, for example, one of the editing functions described in the discussions related to FIGS. 6 through 12. In step 1308 the interactive display displays the modifications the user initiates in step 1306 (this responsive display alteration may be nearly instantaneous). At this point, in step 1310, the interactive display system may permit a user to verify that the alterations initiated in step 1306 are, indeed, the desired modifications. If the user is satisfied with the modifications, the underlying data tables may be altered at this point to reflect the modifications to the line chart representing the data table. Alternatively, the underlying data tables may be modified instantaneously in response to user modification of the line chart. If the user indicates that he is not satisfied with the alterations, the process returns to step 1306 and from there as previously described.

If the user is satisfied with the modifications, the process proceeds to step 1312 where it is determined, through a user query, for example, whether other line charts or line chart segments are to be modified and, if further modifications are desired, the process returns to step 1302 and from there as previously described. If no further modifications are desired, the process proceeds from step 1312 to step 1314 where one or more other operations, such as a simulation using the updated data values may be performed. As previously described, an interactive display system in accordance with the principles of the present invention may also be used in conjunction with a simulator, such as a workflow simulator, to populate data tables and to simulate operations, assuming the table values as starting points. The results of the simulations may also be used to update some of the table entries. After the operations of step 1314 the process may proceed to step 1316 where the underlying table values may be updated, if, for example, the operation of step 1314 involves a simulation which produces new table values. From step 1316 the process proceeds to step 1318 where the updated table values are displayed. From step 1318 the process proceeds to step 1320 where it is determined, again, through a user query, or example, whether further editing is desired. If no further table editing is desired, the process proceeds to end in step 1322, otherwise the process returns to step 1302 and from there as previously described.

A software implementation of the above described embodiment(s) may comprise a series of computer instructions either fixed on a tangible medium, such as a computer readable media, e.g. diskette 242, CD-ROM 247, ROM 215, or fixed disc 252 of FIG. 2, or transmittable to a computer system, via a modem or other interface device, such as communications adapter 290 connected to the network 295 over a medium 291. Medium 291 can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although, for the convenience and clarity of description, the above illustrative embodiments make reference to data tables and simulations involving workflow analysis, particularly in the context of call center operations, the provision of readily comprehensible data table representations in accordance with the principles of the present invention is not restricted to any one type of data, nor are the simulations that are supported by the interactive display system restricted to one type of process.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations which utilize a combination of hardware logic, software logic and/or firmware to achieve the same results. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. In a call center comprising a plurality of agent stations and agents, a method comprising:
   (a) receiving a first set of data values, the data being related to each agent, each agent station, and a call center function and being stored in a tabular form;
   (b) generating a first graphical image representative of the first set of data values;
   (c) receiving a user selection of first and second data values in the first set of data values on the first graphical image, a first portion of the first graphical image being positioned between and including the selected first and second data values and second and third portions of the first graphical image being positioned on either side of the first and second data values, respectively, wherein the first, second, and third portions are part of, and defined by points located successively along, the first graphical image, with the second portion being located to the left of the first data value and the third portion being located to the right of the second data value;
   (d) receiving a user selection of an editing function from among a plurality of predetermined editing functions;
   (e) applying the user selected first editing function to the first portion of the first graphical image but not the second and third portions of the first graphical image to generate a second graphical image, the second graphical image comprising the second and third portions on either side of the first and second data values and an edited first portion between the first and second data values, the edited first portion being generated from application of the user selected first editing function to the data values in the first portion and being different from the first portion; and
   (f) revising the first set of data values to yield a second set of data values conforming to the second, third, and edited first portions of the second graphical image, wherein the first and second sets of data simulate the call center function.

2. The method of claim 1, wherein the first set of data values is a table, wherein the table includes a plurality of measurements of a parameter, wherein the parameter has a time varying value, and wherein the set of data values comprises a number of agents assigned to a selected task during a selected time period.

3. The method of claim 1, wherein the second set of data values is a simulation of call center operations based on the first set of data values.

4. The method of claim 1, further comprising:
   (f) displaying a value associated with a specified location on at least one of the first and second graphical images in response to the user positioning a cursor over the specified location, wherein the value is displayed in the vicinity of the cursor.

5. The method of claim 1, wherein each of the first and second graphical images is a strip chart.

6. The method of claim 5, wherein the strip chart is in the form of a bar chart, line chart, or a combination thereof.

7. The method of claim 1, wherein the first and second graphical images comprise a time-series of values associated with comparable measures and wherein the first set of data values is in the form of a plurality of cells, each cell containing a data value.

8. The method of claim 1, further comprising:
(g) receiving from the user a repositioning of at least one point on the first portion of the first graphical image, wherein the user repositions the at least one point using a user manipulable affordance positioned on the first graphical image, wherein the affordance is repositioned using a click-and-drag operation, and wherein the second set of data values conforms to the repositioned at least one point.

9. The method of claim 8, wherein, when the user selects a first mode, a plurality of affordances are displayed on the first graphical image.

10. The method of claim 1, wherein a representation of each of the plurality of editing functions is displayed with the first graphical image in one or more dialog boxes.

11. The method of claim 10, wherein the plurality of editing functions include a plurality of a normal distribution, a Gaussian distribution, a Poisson distribution, a uniform editing function, a double ramp editing function, and an exponential editing function.

12. A computer readable medium comprising processor executable instructions to perform the steps of claim 1.

13. A call center, comprising:
(a) a plurality of agent stations operable to receive customer contacts;
(b) a plurality of agents operable to service the customer contacts;
(c) an input operable to receive a first set of data values, the data being related to each agent, each agent station, and a call center function;
(d) a storage medium operable to store the first set of data values in a tabular form; and
(e) a call center simulator operable to:
(i) generate a first graphical image representative of the first set of data values;
(ii) receive user selected first and second data values in the first set of data values on the first graphical image, a first portion of the first graphical image being positioned between the selected first and second data values and second and third portions of the first graphical image being positioned on either side of the first and second data values, respectively, wherein the first, second, and third portions are part of, and defined by points located successively along, the first graphical image, with the second portion being located to the left of the first data value and the third portion being located to the right of the second data value;
(iii) receive a user selection of an editing function from among a plurality of predetermined editing functions;
(iv) apply the user selected first editing function to the first portion of the first graphical image but not the second and third portions of the first graphical image to generate a second graphical image, the second graphical image comprising the second and third portions on either side of the first and second data values and a edited first portion between the first and second data values, the edited first portion being generated from application of the user selected first editing function to the data values in the first portion and being different from the first portion; and
(v) revise the first set of data values to yield a second set of data values conforming to the edited first portion of the second graphical image, wherein the second set of data values is a simulation of call center operations based on the first set of data values.

14. The call center of claim 13, wherein the set of data values is a table, wherein the table includes a plurality of measurements of a parameter, wherein the parameter has a time varying value, and wherein the set of data values comprises a number of agents assigned to a selected task during a selected time period.

15. The call center of claim 14, wherein the table is used to simulate a workflow process and wherein the second set of data values is a simulation of call center operations based on the first set of data values.

16. The call center of claim 13, wherein the simulator is operable to:
(vi) display a value associated with a specified location on at least one of the first and second graphical images in response to the user positioning a cursor over the specified location, wherein the value is displayed in the vicinity of the cursor.

17. The call center of claim 13, wherein each of the first and second graphical images is a strip chart.

18. The call center of claim 17, wherein the strip chart is in the form of a bar chart, line chart, or a combination thereof.

19. The call center of claim 13, wherein the first and second graphical images comprise a time-series of values associated with comparable measures and wherein the first set of data values is in the form of a plurality of cells, each cell containing a data value.

20. The call center of claim 13, wherein the simulator is operable, when the user selects a first mode, to display a plurality of affordances on the first graphical image.

21. The call center of claim 13, wherein the simulator is further operable to display, along with the first graphical image, a representation of each of the plurality of editing functions in one or more dialog boxes.

22. The call center of claim 13, wherein the plurality of editing functions include a plurality of a normal distribution, a Gaussian distribution, a Poisson distribution, a uniform editing function, a double ramp editing function, and an exponential editing function.

* * * * *